United States Patent
Fujikawa et al.

(10) Patent No.: US 10,365,360 B2
(45) Date of Patent: Jul. 30, 2019

(54) RADAR APPARATUS

(71) Applicant: FURUNO ELECTRIC CO., LTD., Nishinomiya (JP)

(72) Inventors: Takumi Fujikawa, Sanda (JP); Yugo Kubota, Asiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 284 days.

(21) Appl. No.: 15/268,212

(22) Filed: Sep. 16, 2016

(65) Prior Publication Data

US 2017/0082743 A1    Mar. 23, 2017

(30) Foreign Application Priority Data

Sep. 18, 2015  (JP) .................................. 2015-184871

(51) Int. Cl.
*G01S 13/524*   (2006.01)
*G01S 7/24*   (2006.01)
(Continued)

(52) U.S. Cl.
CPC ............ *G01S 13/5244* (2013.01); *G01S 7/24* (2013.01); *G01S 7/2923* (2013.01); *G01S 7/414* (2013.01);
(Continued)

(58) Field of Classification Search
CPC ............................... G01S 13/5244; G01S 7/24
(Continued)

(56) References Cited

U.S. PATENT DOCUMENTS 4,313,115 A * 1/1982 O'Sullivan ........... G01S 13/931
                                                              342/182
5,351,055 A * 9/1994 Fujikawa ................ G01S 7/064
                                                              342/159
(Continued)

FOREIGN PATENT DOCUMENTS

JP    S 61-270631 A    11/1986
JP    2003-337170 A    11/2003
(Continued)

OTHER PUBLICATIONS

European Search Report dated Feb. 15, 2017 in EP Application No. 16189298.9, 7 pgs.

*Primary Examiner* — Marcus E Windrich
(74) *Attorney, Agent, or Firm* — Knobbe, Martens, Olson & Bear, LLP (57) ABSTRACT

A radar apparatus (100) for detecting around a ship is provided. The apparatus (100) includes an unstable area detecting module (10) configured to observe a variation in a signal level corresponding to detection data over a plurality of scans, obtain unstableness of the observed detection data, and detect unstable areas (41, 42, 43, 44, 410, 420, 430, 440) based on the unstableness, a determining module (22) configured to measure a size of each of the areas and determine the area as a small target object area (41, 43) when the size of the area is below a given threshold, a processing module (6) configured to process the detection data corresponding to the small target object area (41, 43) to be emphasized when displayed, than the detection data corresponding to the other unstable area (42, 44), and a display unit (8) configured to display the processing result.

9 Claims, 7 Drawing Sheets

(51) Int. Cl.
*G01S 7/292* (2006.01)
*G01S 7/41* (2006.01)
*G01S 13/42* (2006.01)
*G01S 13/93* (2006.01)

(52) U.S. Cl.
CPC ........ *G01S 13/426* (2013.01); *G01S 13/9307* (2013.01)

(58) Field of Classification Search
USPC .......................................................... 342/41
See application file for complete search history.

(56) References Cited

U.S. PATENT DOCUMENTS

| | | | |
|---|---|---|---|
| 7,423,581 B2* | 9/2008 | Fujikawa | G01S 13/5244 342/159 |
| 8,665,135 B2 | 3/2014 | Dai | |
| 2007/0216566 A1* | 9/2007 | Wood | G01S 13/726 342/41 |
| 2010/0289690 A1* | 11/2010 | Dai | G01S 7/062 342/41 |
| 2011/0102247 A1 | 5/2011 | Pauli et al. | |
| 2011/0102248 A1* | 5/2011 | Maeno | G01S 7/2927 342/179 |
| 2011/0169685 A1* | 7/2011 | Nishiyama | G01S 7/046 342/179 |
| 2012/0127019 A1* | 5/2012 | Nishiyama | G01S 13/538 342/93 |
| 2013/0342382 A1* | 12/2013 | Maeno | G01S 7/2927 342/93 |

FOREIGN PATENT DOCUMENTS

| | | |
|---|---|---|
| JP | 3680265 B2 | 8/2005 |
| JP | 2006-112973 A | 4/2006 |
| JP | 2009-058433 A | 3/2009 |
| JP | 2010-266292 A | 11/2010 |
| JP | 2012-198243 A | 10/2012 |
| JP | 2013-224883 A | 10/2013 |

* cited by examiner

RADAR APPARATUS

CROSS-REFERENCE TO RELATED APPLICATION(S)

This application claims priority under 35 U.S.C. § 119 to Japanese Patent Application No. 2015-184871, which was filed on Sep. 18, 2015, the entire disclosure of which is hereby incorporated by reference.

TECHNICAL FIELD

This disclosure generally relates to a radar apparatus, which suppresses a level of an unnecessary echo and displays the unnecessary echo.

BACKGROUND

Conventionally, a scan correlation in which an echo level is adjusted by using statistical processing based on a latest echo and also a previously acquired echo, so as to create a radar image, is known. By performing the scan correlation, although an echo of a water surface reflection can be suppressed, an echo of, for example, a ship traveling at high speed is also suppressed. Therefore, the scan correlation is preferably performed with suitable processing contents per processing target.

JP3680265B discloses an art in which an area is divided into an interior region and an exterior region, and the processing contents of the scan correlation are differentiated therebetween. Specifically, since a water surface reflection tends to occur at close distance, in the interior region, the scan correlation is performed to increase an influence of a previously acquired echo. Further, in the exterior region, the scan correlation is performed to increase an influence of a latest echo. In this manner, an influence on a target object can be reduced while suppressing the water surface reflection.

JP2006-112973A discloses an art in which whether an echo exists is detected in every pixel in an image memory, and unstableness is detected in every pixel based on a number of times the result of whether the echo exists varies in a plurality of previous scans. For the pixel with high unstableness, the water surface reflection is considered to have occurred, and a scan correlation is performed to increase an influence of a previously acquired echo. Further, JP2009-058433A discloses an art in which not only a pixel with high unstableness, but also pixels therearound are considered unstable and a scan correlation is performed thereon. Thus, a water surface reflection is accurately suppressed.

Meanwhile, there is a case where the echo suppression is not necessary even when the unstableness of the echo is high. For example, for fishing gears (float, flag buoy, etc.) installed in water, since they sway due to occurrence of waves, wind, etc., the number of times the result of whether the echo exists varies easily becomes large. Therefore, with the radar apparatuses of JP2006-112973A and JP2009-058433A, areas where these fishing gears are installed are considered unstable, and echoes of the fishing gears etc. may be suppressed.

However, the echoes indicating locations of the fishing gears are necessary for an installer of the fishing gears, and it is not suitable to suppress the echoes. Even for people other than the installer, the echoes indicating locations of the fishing gears are necessary in order to avoid the fishing gears in navigation.

SUMMARY AND EFFECTS

The purpose of this disclosure relates to providing a radar apparatus, which suppresses an unstable echo caused by, for example, a water surface reflection, while preventing suppression of an unstable echo caused by, for example, a fishing gear which sways due to occurrence of a wave, wind, etc.

According to one aspect of this disclosure, a radar apparatus for detecting around a ship is provided with the following configuration. Specifically, the radar apparatus includes an unstable area detecting module, a determining module, a processing module and a display unit. The unstable area detecting module observes a variation in a signal level corresponding to detection data over a plurality of scans, obtains unstableness of the observed detection data, and detects unstable areas based on the unstableness. The determining module measures a size of each of the unstable areas and determines the unstable area as a small target object area when the size of the unstable area is below a given threshold. The processing module processes the detection data corresponding to the small target object area to be emphasized when displayed, than the detection data corresponding to the other unstable area. The display unit displays a processing result of the processing module.

Thus, a water surface reflection area extends over a wider range than the small target object area, and therefore, by using this characteristic, the small target object area can accurately be identified. Further, by emphasizing the detection data (data in an echo) of the small target object area more than that of the other area, other unstable echoes (e.g., water surface reflections) can be suppressed while displaying a target object swaying at a water surface.

With the radar apparatus described above, in a case where a plurality of detection data is determined as unstable in a given area, the unstable area detecting module may determine the given area as a continuous unstable area. Or, In a case where the unstable areas (410, 420, 430, 440) overlap with each other, these unstable areas (410, 420, 430, 440) are determined as one unstable area (400)

Thus, a plurality of unstable areas close to each other to some extent are determined as a single continuous unstable area. Therefore, the size of the unstable area can accurately be measured, and as a result, the identification of the small target object area becomes more accurate.

With the radar apparatus described above, the determining module may measure the size of the unstable area based at least on one of a distance range and an azimuth range within which the unstable area exists.

Thus, the radar apparatus detects the detection data in a polar coordinate system. Therefore, the size of the unstable area can be measured with simple processing.

With the radar apparatus described above, when the size of the unstable area is measured based on the azimuth range, the determining module may lower the threshold as a distance of the unstable area from the ship becomes farther.

Here, even if the unstable areas have the same size, the azimuth ranges within which the unstable areas exist are different depending on a distance from the ship. Therefore, by changing the threshold as above, the size of the unstable area can be measured more accurately.

With the radar apparatus described above, the small target object area may include an area where a fishing gear that sways at a water surface exists.

Thus, an installer of the fishing gear can confirm a location of the fishing gear. Even people other than the installer can avoid the fishing gear in navigation.

With the radar apparatus described above, when the size of the unstable area is above the threshold, the determining module may determine the unstable area as a water surface reflection area where a water surface reflection occurs.

Thus, by using the processing to identify the water surface reflection area, the small target object area can be identified.

BRIEF DESCRIPTION OF THE DRAWING(S)

The present disclosure is illustrated by way of example and not by way of limitation in the figures of the accompanying drawings, in which like reference numerals indicate like elements and in which.

DETAILED DESCRIPTION

Figure 1:
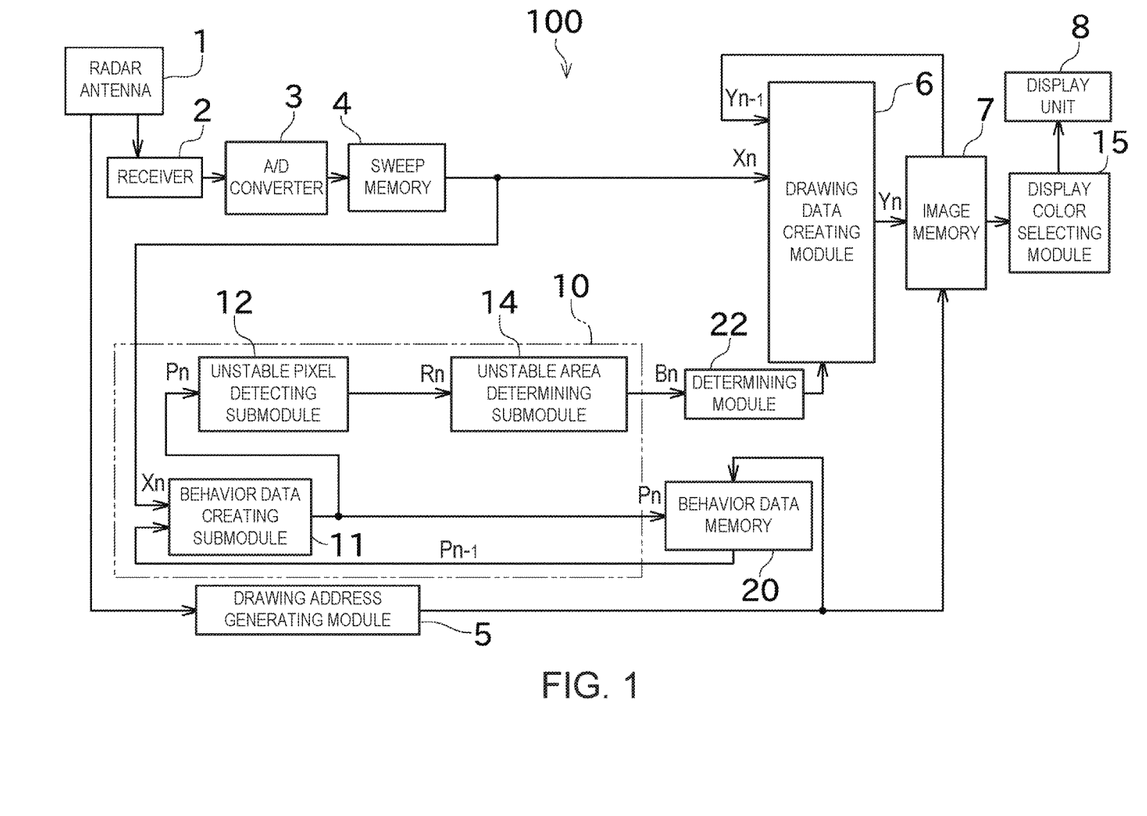
FIG. 1 is a block diagram illustrating a substantial configuration of a radar apparatus according to one embodiment of this disclosure.

One embodiment of this disclosure is described with reference to the accompanying drawings. In the following embodiments, an example is illustrated in which this disclosure is applied to a ship. However, the present disclosure may be applied to any other watercrafts including boats, vessels, and submarines. FIG. 1 is a block diagram illustrating a substantial configuration of a radar apparatus 100 for a ship according to this embodiment of this disclosure.

The radar apparatus 100 of this embodiment includes a radar antenna 1 configured to transmit a pulse-shaped transmission wave (e.g., microwave) generated by a magnetron, and receive a reflection wave caused by the transmission wave, as a reception signal (echo). Note that, the transmission wave transmitted by the radar apparatus 100 is not limited to have the pulse shape, and may be a continuous wave. Further, the transmission wave may be generated by, for example, a semiconductor element instead of the magnetron. Moreover, the radar antenna 1 repeatedly performs the transmission and the reception of the transmission wave while rotating in a horizontal plane at a given rotation cycle. Furthermore, instead of the radar apparatus 100 of this embodiment, a radar apparatus having a configuration that the radar antenna does not rotate may be applied. For example, a radar apparatus including antenna elements over an entire circumference thereof and a radar apparatus configured to perform the detection only in a particular direction (e.g., front direction), etc. do not need to rotate the radar antenna. Further, the radar antenna 1 is not limited to be a single antenna which performs both the transmission and the reception of the radio wave, and may be divided into an antenna for transmission and an antenna for reception.

Here, a period of time from a transmission of the transmission wave until an echo returns is proportional to a distance from the radar antenna 1 to a target object. Therefore, a location of the target object is acquirable in a polar coordinate system centering on the radar antenna 1, by having a moving radius r as the time period from the transmission of the transmission wave until the reception of the reception signal, and an argument θ as an antenna angle at a timing when the transmission wave is transmitted. By plotting the location of the target object acquired in the polar coordinate system, a radar image is obtained.

The radar apparatus 100 of this embodiment also includes a display unit 8. The display unit 8 is a display screen, such as a liquid crystal display, and is a raster scan type display capable of displaying graphically. The radar image created as described above is displayed on the display unit 8.

Next, a configuration of receiving an echo and acquiring data of the echo is described. The radar apparatus 100 includes a receiver 2, an A/D converter 3, and a sweep memory 4.

The receiver 2 receives the reflection wave as the reception signal via the radar antenna 1. Note that, data included in the reception signal is referred to as the detection data. The receiver 2 detects and amplifies the reception signal. The signal obtained upon the detection of the echo by the receiver 2, is inputted to the A/D converter 3. The A/D converter 3 samples the signal, converts it into digital data comprised of a plurality of bits, and outputs it to the sweep memory 4.

The sweep memory 4 is capable of storing the detection data for one sweep in real time. Note that, the phrase "sweep" means a series of operations from a signal transmission to the next signal transmission, and the phrase "detection data for one sweep" means data received in a period from a signal transmission until the next signal transmission. Further, the phrase "scan" means an operation that the radar apparatus 100 acquires a series of detection data around (in this embodiment, 360°) the ship on which the radar apparatus 100 is installed. In this embodiment, the operation of acquiring the detection data for 360° around the ship is referred to as one scan, and an operation of acquiring the detection data for 360° around the ship a plurality of times is referred to as a plurality of scans.

The data for one sweep is stored in the sweep memory 4. The sweep memory 4, when the detection data is newly written, sequentially outputs this detection data before it is overwritten with data from the next sweep.

The radar apparatus 100 includes, as a configuration of processing the detection data, a drawing address generating module 5, a drawing data creating module 6 (processing module), an image memory 7, an unstable area detecting module 10, a behavior data memory 20, and a determining module 22. Here, the drawing address generating module 5, the drawing data creating module 6, the unstable area detecting module 10, and the determining module 22 are achieved by executing given programs with an FPGA, a CPU, etc.

The drawing address generating module 5 receives from the radar antenna 1 sweep angle data (data indicating an angle θ of the radar antenna 1) with respect to a given direction (e.g., heading). The drawing address generating module 5 generates an address indicating a pixel corresponding to the detection data based on the angle θ of the radar antenna 1 and a reading position n of the detection data from the sweep memory 4. Specifically, the drawing address generating module 5 performs operations of Equations 1 and 2 described below. Here, (X, Y) is an address indicating a pixel in the image data stored in the image memory 7. Further, $(X_s, Y_s)$ is an address indicating a pixel corresponding to a center position of the sweep (location of the radar antenna 1), in the image data stored in the image memory 7.

$$X = X_s + n \cdot \sin \theta \quad (1)$$

$$Y = Y_s + n \cdot \cos \theta \quad (2)$$

When an echo intensity $Y_n$ is outputted to the image memory 7 from the drawing data creating module 6, the address (X, Y) is inputted to an address specifying module of the image memory 7. Thus, a position of a target object echo acquired in the polar coordinate system is converted into an XY orthogonal coordinate system, and the data of the echo intensity $Y_n$ is stored in the pixel at the coordinates (X, Y) corresponding to the position of the target object echo. As a result, image data in which the echo intensity is plotted on a plane corresponding to the position of the target object echo is generated. Therefore, the radar image is displayed on the display unit 8 based thereon. Note that, the address of the pixel outputted by the drawing address generating module 5 is also outputted to the behavior data memory 20 described later.

Next, a configuration of detecting an unstable area that is an area where existence/non-existence of the echo frequently varies is described.

The radar apparatus 100 includes the unstable area detecting module 10 configured to detect the unstable area. The unstable area detecting module 10 observes a variation of a signal level corresponding to the detection data over a plurality of scans, obtains unstableness of the observed detection data, and detects the unstable area based on the unstableness. Detailed description thereof is given as follows. The unstable area detecting module 10 includes a behavior data creating submodule 11, an unstable pixel detecting submodule 12, and an unstable area determining submodule 14.

The behavior data creating submodule 11 receives an echo intensity $X_n$ from the sweep memory 4 and, upon the drawing address generating module 5 determining the address of the pixel in which the echo intensity $X_n$ is stored, obtains behavior data $P_n$ expressing existence/non-existence of the echo based on the signal levels of the echoes obtained in the pixel concerned over a plurality of previous scans. Specifically, the behavior data creating submodule 11 determines whether the echo intensity $X_n$ received from the sweep memory 4 indicates a given detection threshold or above. For the detection threshold, a value obtained by adding a given offset value to a detected white noise level is used, for example. The behavior data creating submodule 11 generates an echo detection flag of "1" if the latest echo intensity $X_n$ is the detection threshold or above, and generates an echo detection flag of "0" if the latest echo intensity $X_n$ is below the detection threshold.

Next, the behavior data creating submodule 11 reads immediately previous behavior data $P_{n-1}$ from the behavior data memory 20. For example, in a case where the behavior data $P_n$ is comprised of 8 bits, behaviors of the echoes in 8 previous scans are able to be expressed and the behavior data $P_{n-1}$ are able to be expressed as "00000001." Note that, "00000001" indicates that the echo is detected in the pixel concerned in the immediately previous scan but not in 7 scans before thereof. Next, the behavior data creating submodule 11 shifts the immediately previous behavior data $P_{n-1}$ to the left by one digit, outputs a latest echo detection flag to the least significant bit, and generates the latest behavior data $P_n$. For example, if the echo is detected in the latest scan, "00000001" as $P_{n-1}$ is updated to be "00000011" as $P_n$, which indicates that the echo is detected at the position of the pixel concerned in the latest two scans but not in 6 scans before thereof. Thus, the behavior data $P_n$ is comprised of a plurality of bits and stores the echo detection flags indicating the existence/non-existence of the echo over the plurality of previous scans.

The behavior data creating submodule 11 outputs the generated behavior data $P_n$ to the behavior data memory 20. The behavior data memory 20 is a storing medium which is designed with an orthogonal coordinate system in correspondence to the address in the image memory 7, and stores the behavior data $P_n$ in association with the pixels in the image memory 7 in a one-to-one relationship.

Further, the behavior data $P_n$ generated by the behavior data creating submodule 11 is outputted to the unstable pixel detecting submodule 12.

The unstable pixel detecting submodule 12, upon receiving the behavior data $P_n$ from the behavior data creating submodule 11, obtains the number of variations in state between adjacent bits in the behavior data $P_n$ as unstableness of the detection data at the observed position. Specifically, the unstable pixel detecting submodule 12 detects the number of times the value changes from "1" to "0" or from "0" to "1" between the adjacent bits (e.g., between zero and first bits or sixth and seventh bits). For example, when the behavior data $P_n$ is "11111111" or "00000000," the unstableness is "0," and when the behavior data $P_n$ is "10101010," the unstableness is "7."

The unstable pixel detecting submodule 12, upon obtaining the unstableness, compares the unstableness with a given unstable state detection threshold to generate unstable state detection data $R_n$. For example, in a case where the unstableness "4" is defined as the unstable state detection threshold, $R_n=1$ when the unstableness is "7," and $R_a=0$ when the unstableness is "1." The unstable pixel detecting submodule 12 outputs the unstable state detection data $R_n$ to the unstable area determining submodule 14.

When the observed unstable state detection data $R_n$ is 1, the unstable area determining submodule 14 detects the pixel corresponding to the observed unstable state detection data $R_n$ as an unstable area reference pixel. Even when $R_n=0$, if the currently processed pixel is located near an unstable area reference pixel, the unstable area determining submodule 14 determines that the currently processed pixel is in the unstable area.

Figure 2:
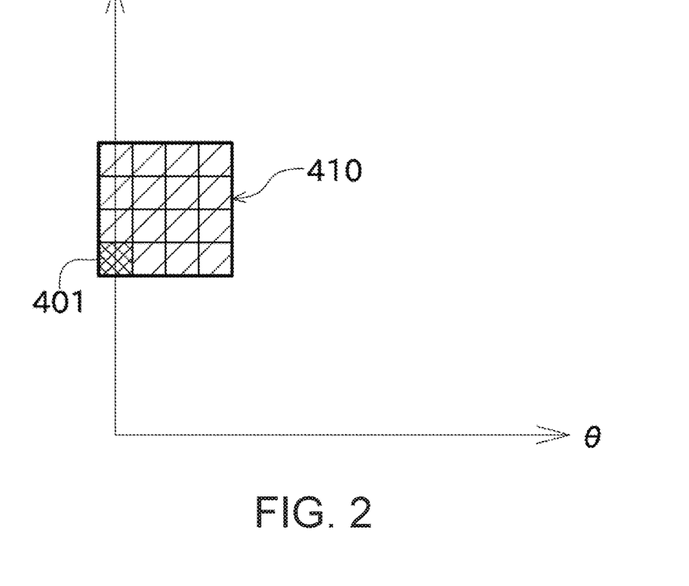
FIG. 2 is a view illustrating a manner of expanding an unstable area based on an unstable area reference pixel.
Figure 3:
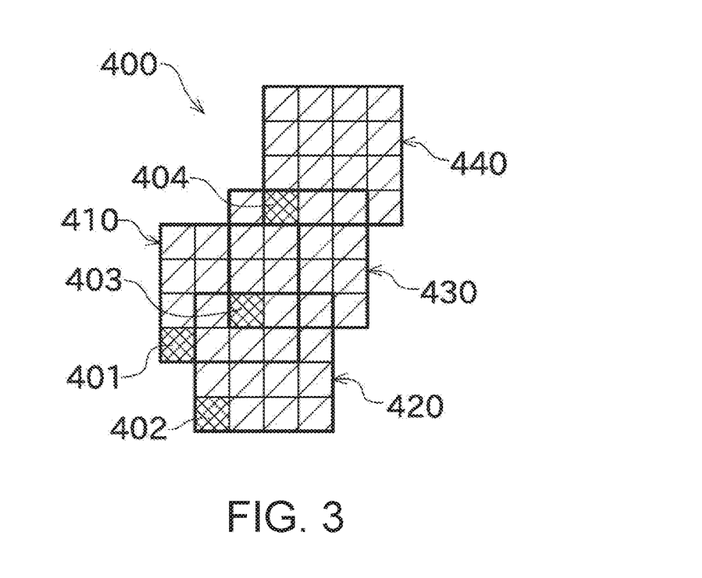
FIG. 3 is a view illustrating synthesizing of unstable areas.

Hereinafter, the above-described operation of the unstable area determining submodule 14 is described in detail with reference to FIGS. 2 and 3. The unstable area determining submodule 14, upon detecting an unstable area reference pixel 401 as illustrated in FIG. 2, determines an unstable area 410 by selecting a given number of pixels in an orthogonal coordinate system to expand the unstable area in a distance direction r and a sweep rotational direction (the rotational direction of the radar antenna 1) θ. Here, the unstable area determining submodule 14 designs the unstable area 410 so that the unstable area reference pixel 401 is at a closest position to the center position of the sweep (the location of the radar antenna 1) in the unstable area 410 in the distance direction r and the sweep rotational direction θ. Note that, the detection of the unstable area reference pixel 401 and the designing of the unstable area 410 may be performed in the orthogonal coordinate system alternatively/additionally to the polar coordinate system. However, since the detection data acquired by the radar is the polar coordinate system, by performing the above operations in the polar coordinate system alone, the circuit configuration is simplified.

Such designing of the unstable area is performed every time the unstable area determining submodule 14 receives the unstable state detection data $R_n=1$ and detects the unstable area reference pixel. For example, in FIG. 3, a plurality of unstable area reference pixels 401, 402, 403 and 404 are detected. Specifically, the unstable area reference pixels 401, 402, 403 and 404 exist at positions that unstable areas 410, 420, 430 and 440 designed based thereon, respectively, partially overlap with at least one of the other areas (i.e., a plurality of unstable detection data exist in a given area). In this case, the unstable area determining submodule 14 designs an unstable area 400 (continuous unstable area 400) by synthesizing the unstable area 410 designed based on the unstable area reference pixel 401, the unstable area 420 designed based on the unstable area reference pixel 402, the unstable area 430 designed based on the unstable area reference pixel 403, and the unstable area 440 designed based on the unstable area reference pixel 404.

The unstable area determining submodule 14 generates unstable area data $B_n$ indicating whether the currently-processed pixel corresponds to the unstable area 400, and outputs it to the determining module 22. Specifically, the unstable area determining submodule 14 generates the unstable area data $B_n=1$ if the currently-processed pixel corresponds to the unstable area 400, and generates the unstable area data $B_n=0$ if the currently-processed pixel does not correspond to the unstable area 400 to output to the determining module 22.

The determining module 22 determines whether the unstable area is a water surface reflection area (an unstable area where a water surface reflection occurs) or a small target object area (an unstable area smaller in size than the water surface reflection area), based on the information received from the unstable area determining submodule 14. Detailed description thereof is given as follows with reference to FIGS. 4 and 5.

Generally, the water surface reflection area extends over a wide range. On the other hand, the small target object area is an area determined to be unstable because of a fishing gear, a floating object, etc. Therefore, compared with the water surface reflection area, the range thereof is narrower. In consideration of this point, the determining module 22 measures the size of the unstable area, and determines whether the unstable area is the water surface reflection area or the small target object area based on the measured size. The size of the unstable area is measured, for example, based on one of a distance range and an azimuth range within which the unstable area exists.

Figure 4:
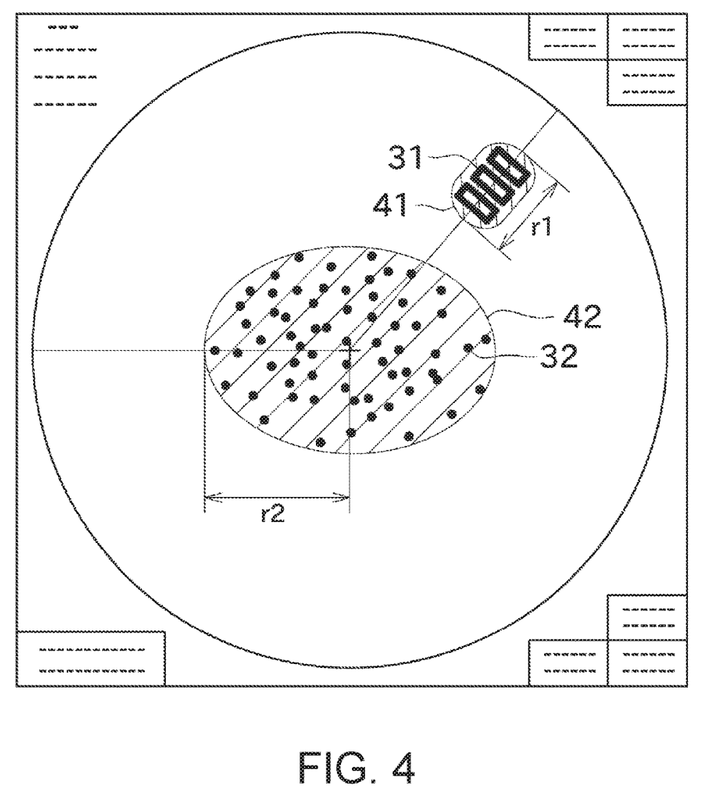
FIG. 4 is a view conceptually illustrating processing of measuring the unstable area by using a distance from a ship.

First, the processing of measuring the size of the unstable area based on the distance range within which the unstable area extends is described. FIG. 4 illustrates two unstable areas 41 and 42 detected by the unstable area detecting module 10. The unstable area 41 is an area determined as unstable due to small target object echoes 31 (specifically, echoes of a fishing gear (seaweed net)), i.e., the small target object area. The fishing gear, such as a float exposed at a water surface, is considered as an unstable area since it moves by a wave, wind, etc. at the water surface and the unstableness rises.

The unstable area 42 is an area determined as unstable due to water surface reflection echoes 32 (water surface reflection area). Specifically, an area with a wave is considered as an unstable area since the wave constantly changes in position and height and the unstableness rises. In FIG. 4, the unstable areas 41 and 42 are illustrated for easier understanding of the processing of measuring the size of the unstable area.

As illustrated in FIG. 4, the determining module 22 measures a size (r1) of the unstable area 41 by counting (measuring) the distance range within which the unstable area 41 extends, at an azimuth where the unstable area 41 exists. Further, the determining module 22 measures a size (r2) of the unstable area 42 by counting (measuring) the distance range within which the unstable area 42 extends, at an azimuth where the unstable area 42 exists. The determining module 22 compares the distance ranges r1 and r2 of the measured unstable areas with a given threshold ra. The determining module 22 determines that the entire unstable area is the small target object area if the measured distance range is below the threshold ra, and determines that the entire unstable area is the water surface reflection area if the measured distance range is above the threshold ra. In this embodiment, since the relationship of r1<ra<r2 is satisfied, the determining module 22 determines the entire unstable area 41 as the small target object area and the entire unstable area 42 as the water surface reflection area.

Figure 5:
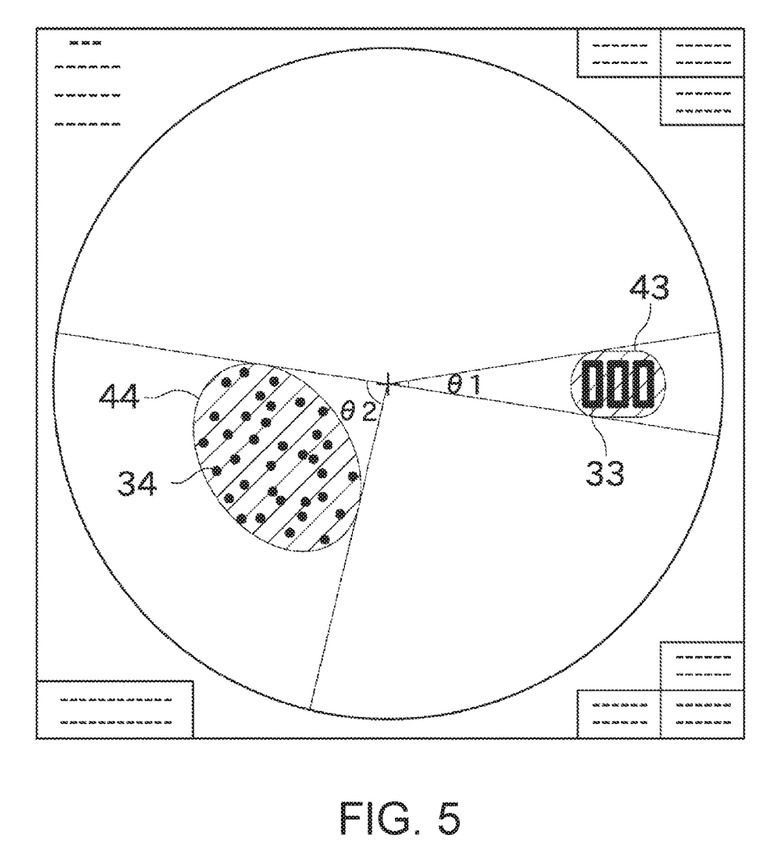
FIG. 5 is a view conceptually illustrating processing of measuring the unstable area by using an azimuth from the ship.

Next, the processing of measuring the size of the unstable area based on the azimuth range within which the unstable area exists is described. FIG. 5 illustrates two unstable areas 43 and 44 detected by the unstable area detecting module 10. The unstable area 43 is an unstable area caused by small target object echoes 33, and the unstable area 44 is a water surface reflection area caused by water surface reflection echoes 34. As illustrated in FIG. 5, the determining module 22 measures azimuth ranges θ1 and θ2 within which the unstable areas 43 and 44 exist, respectively. The determining module 22 compares the azimuth ranges θ1 and θ2 with a given threshold θ. The determining module 22 determines the unstable area as the small target object area if the azimuth range is below the threshold θ, and determines the unstable area as the water surface reflection area if the azimuth range is above the threshold θ. Here, even if the unstable areas have the same size, values of the measured azimuth ranges thereof are different depending on a distance from the ship. In consideration of this point, the determining module 22 uses the threshold θ which becomes lower as the unstable area becomes farther (a threshold θa is used for θ1, and a threshold θb is used for θ2). In this embodiment, since the relationships of θ1<θa and θb<θ2 are satisfied, the determining module 22 determines the unstable area 43 as the small target object area and the unstable area 44 as the water surface reflection area.

In this manner, the determining module 22 determines whether the unstable area is the small target object area or the water surface reflection area based on the size of the unstable area. In this embodiment, as described with reference to FIGS. 2 and 3, the unstable area is defined by being expanded based on the unstable area reference pixel, and a plurality of unstable areas close to each other to some extent are determined as a single continuous unstable area. Thus, the size of the unstable area is accurately measured, and therefore, the identification of the small target object area becomes more accurate.

The determining module 22 determines whether the unstable area is the small target object area or the water surface reflection area as described above, and the unstable area pixels determined as the water surface reflection area and the pixels in the unstable area determined as the small target object area are outputted to the drawing data creating module 6 in association with their determination results. Note that, a configuration in which only one of the pixels in the unstable area determined as the water surface reflection area and the pixels in the unstable area determined as the small target object area is outputted to the drawing data creating module 6 may be adopted.

The drawing data creating module 6 creates drawing data based on the data described above. Specifically, processing expressed by the following Equation 3 (scan correlation) is performed.

$$Y_n = \alpha X_n + \beta Y_{n-1} \quad (3)$$

Here, α is a coefficient for determining an influence of a latest echo intensity, and the influence of the latest echo intensity is increased as α becomes larger. On the other hand, β is a coefficient for determining an influence of a previous echo intensity, and the influence of the previous echo intensity is increased as β becomes larger. Further, by satisfying α+β>1, the echo intensity outputted to the image memory 7 is increased (the echo is emphasized). On the other hand, by satisfying α+β<1, the echo intensity outputted to the image memory 7 is lowered (the echo is suppressed).

The drawing data creating module 6 changes the values of α and β according to the area. For example, α and β may be set as follows.

| Small target object area: α+β>1 | (Processing 1) |
|---|---|
| Water surface reflection area: α+β<1 | (Processing 2) |
| Other area: α+β=1 | (Processing 3) |

Note that, the magnitude relationship between α and β described above is arbitrary and may suitably be changed. Moreover, the same α and β may be used between the small target object area and an area other than the unstable areas (other area).

Figure 6:
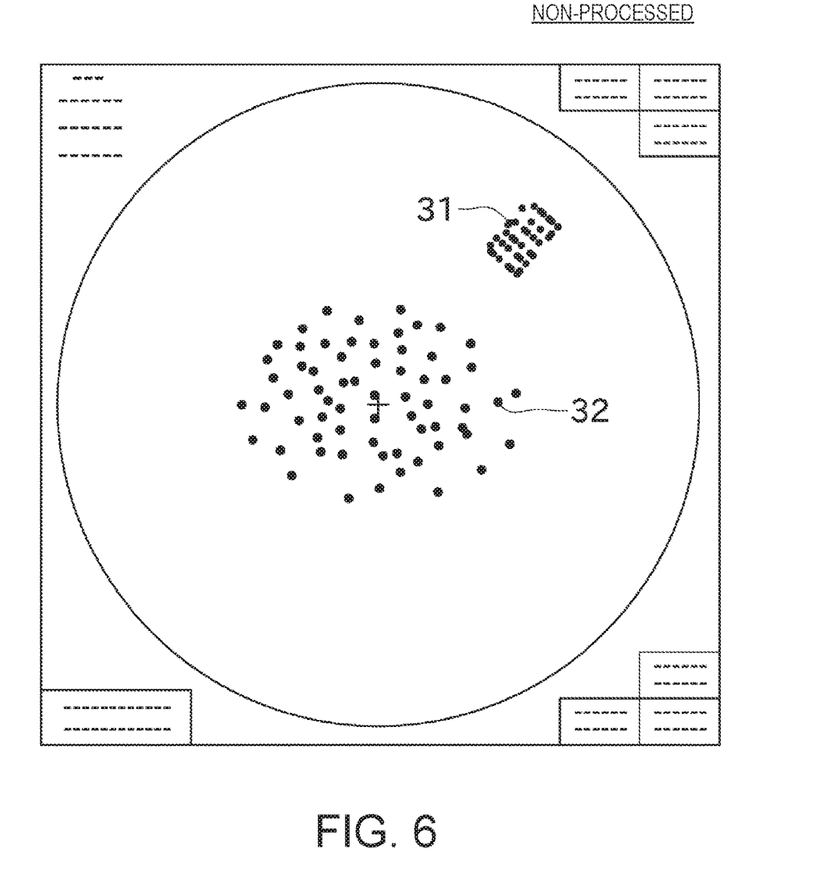
FIG. 6 is a view illustrating a non-processed radar image.
Figure 7:
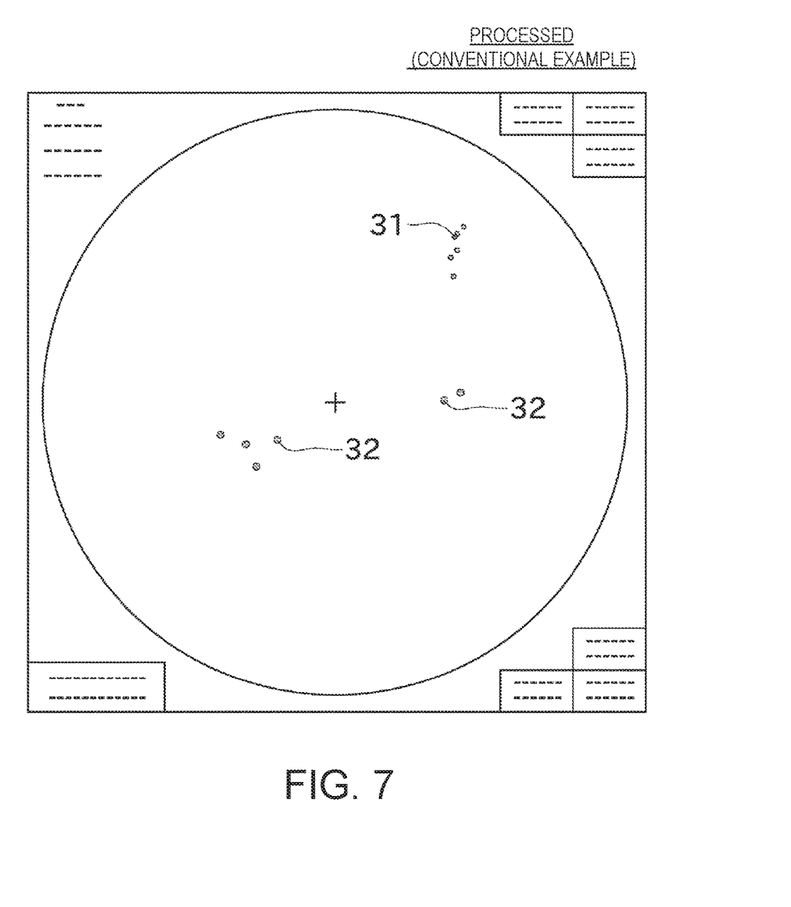
FIG. 7 is a view illustrating a processed radar image in a conventional example.

Conventionally, Processing 2 is performed on the unstable area and Processing 3 is performed on the other area. However, since the water surface reflection area is not discriminated from the small target object area, in a situation where the small target object echoes 31 (e.g., fishing gear) and the water surface reflection echoes 32 are displayed as illustrated in FIG. 6, Processing 2 is performed on both the areas where the small target object echoes 31 and the water surface reflection echoes 32 exist. Therefore, as illustrated in FIG. 7, not only the water surface reflection echoes 32, but the small target object echoes 31 are also suppressed.

Figure 8:
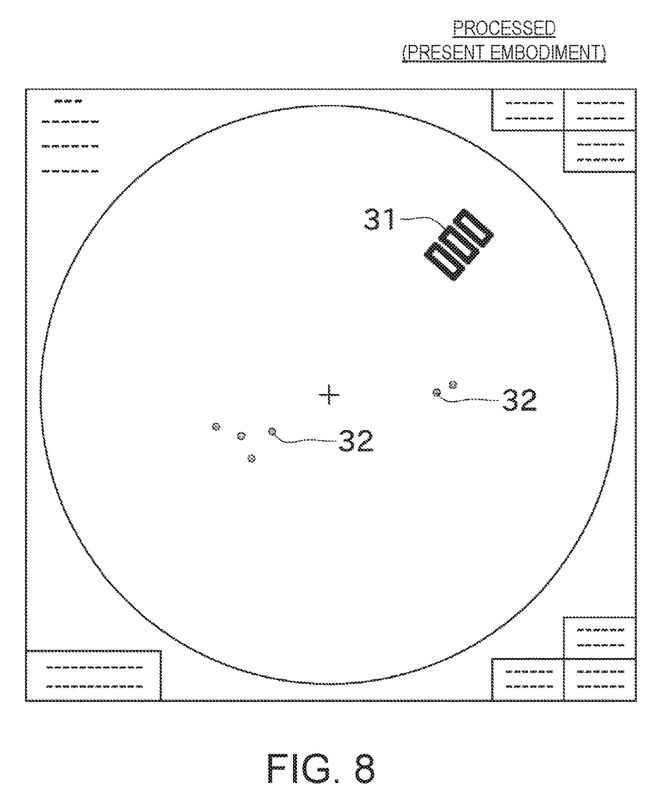
FIG. 8 is a view illustrating a processed radar image of the embodiment.

In this regard, in this embodiment, the unstable areas are categorized into the water surface reflection area and the small target object area. Processing 2 is performed on the area determined as the water surface reflection area, and Processing 1 is performed on the area determined as the small target object area. Therefore, even by performing the scan correlation in the situation illustrated in FIG. 6, as illustrated in FIG. 8, the water surface reflection echoes 32 are suppressed while preventing the suppression of the small target object echoes 31. As a result, the unstable echoes of the target object (e.g., fishing gear) can be confirmed while suppressing the water surface reflections.

Note that in this embodiment, the radar apparatus 100 includes a display color selecting module 15 configured to change a display color for every kind of echo. The display color selecting module 15 differentiates the color according to the kind of the echo outputted by the image memory 7 and displays it on the display unit 8. Specifically, the echo indicating the water surface reflection is displayed in a different color from other echoes. Note that, the color may be differentiated between the unstable echo of the small target object and an echo of a different target object. Here, the phrase "differentiate the color" means differentiating at least one of hue, chroma and brightness.

As described above, the radar apparatus 100 of this embodiment includes the unstable area detecting module 10, the determining module 22, the drawing data creating module 6, and the display unit 8. The unstable area detecting module 10 observes the variation of the detection data in signal level over a plurality of scans, obtains the unstableness of the observed detection data, and detects the unstable area based on the unstableness. The determining module 22 determines whether the unstable area is the small target object area that is the area based on the target object. The drawing data creating module 6 emphasizes each echo in the small target object area compared with each echo in other unstable area. The display unit 8 displays a processing result of the drawing data creating module 6.

Thus, by emphasizing the echo of the small target object area more than the echo of the other area, other unstable echoes (e.g., water surface reflections) are suppressed while displaying the target object swaying at the water surface. Further, since the water surface reflection area extends over a wider range than the small target object area, the small target object area is accurately identified by using this characteristic.

Although the embodiment of this disclosure is described above, the above configuration may be modified as follows, for example.

In the above embodiment, the unstable areas are categorized into the small target object area and the water surface reflection area; however, they may further be categorized into a different unstable area.

In the above embodiment, the processing of measuring the size of the unstable area based on the distance range or the azimuth range of the unstable area is described; however, it may be measured based on both the distance and azimuth ranges.

The method of emphasizing the echo of the small target area is not limited to the scan correlation described above, and for example, a gain adjustment may be used. Further, the levels of the signals corresponding to the echoes in the small target object area may be increased or the levels of the signals corresponding to the echoes in the water surface reflection area may be lowered (needless to say both the methods may be combined in use).

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A radar apparatus for detecting around a ship, comprising:
  processing circuitry configured to:
    determine a variation in a signal level corresponding to detection data over a plurality of scans;

determine a level of unstableness of the detection data based on the variation in the signal level;

detect a set of unstable areas based on the level of unstableness;

measure a size of each of the set of unstable areas and determine that the unstable area corresponds to a small target object area when the size of the unstable area is below a given threshold; and process a first portion of the detection data corresponding to the small target object area that is to be emphasized compared to other portions of the detection data when displayed to obtain a processing result, the other portions of the detection data corresponding to one or more other unstable areas of the set of unstable areas; and a display unit configured to display the processing result of the processing circuitry.

2. The radar apparatus of claim 1, wherein in a case where a plurality of detection data is determined as unstable in a given area, the processing circuitry determines the given area as a continuous unstable area.

3. The radar apparatus of claim 1, wherein the processing circuitry measures the size of the unstable area based at least on one of a distance range and an azimuth range within which the unstable area exists.

4. The radar apparatus of claim 2, wherein the processing circuitry measures the size of the unstable area based at least on one of a distance range and an azimuth range within which the unstable area exists.

5. The radar apparatus of claim 3, wherein when the size of the unstable area is measured based on the azimuth range, the processing circuitry lowers the threshold as a distance of the unstable area from the ship becomes farther.

6. The radar apparatus of claim 1, wherein the small target object area includes an area where a fishing gear installed in water and that sways at a water surface exists.

7. The radar apparatus of claim 5, wherein the small target object area includes an area where a fishing gear installed in water and that sways at a water surface exists.

8. The radar apparatus of claim 1, wherein when the size of the unstable area is above the threshold, the processing circuitry determines the unstable area as a water surface reflection area where a water surface reflection occurs.

9. The radar apparatus of claim 7, wherein when the size of the unstable area is above the threshold, the processing circuitry determines the unstable area as a water surface reflection area where a water surface reflection occurs.

* * * * *